US012785921B2

(12) United States Patent
Lin et al.

(10) Patent No.: US 12,785,921 B2
(45) Date of Patent: Nov. 3, 2026

(54) RECEIVER PERFORMING ADAPTIVE CALIBRATION, AND DATA RECEIVING METHOD

(71) Applicant: National Tsing Hua University, Hsinchu City (TW)

(72) Inventors: Yen-Po Lin, Hsinchu City (TW); Chun-Chang Lu, Hsinchu City (TW); Pen-Jui Peng, Hsinchu City (TW); Ping-Hsuan Hsieh, Hsinchu City (TW)

(73) Assignee: NATIONAL TSING HUA UNIVERSITY, Hsinchu City (TW)

( * ) Notice: Subject to any disclaimer, the term of this patent is extended or adjusted under 35 U.S.C. 154(b) by 80 days.

(21) Appl. No.: 19/056,252

(22) Filed: Feb. 18, 2025

(65) Prior Publication Data

US 2026/0246602 A1 Aug. 20, 2026

(51) Int. Cl.
*H04L 7/00* (2006.01)

(52) U.S. Cl.
CPC .................................. *H04L 7/0025* (2013.01)

(58) Field of Classification Search
CPC ..................................................... H04L 7/0025
See application file for complete search history.

(56) References Cited

U.S. PATENT DOCUMENTS 8,180,012 B1 5/2012 Do et al.
2009/0238307 A1* 9/2009 Singh ..................... H03K 5/135 375/332
2023/0318887 A1* 10/2023 Simpson ........... H04L 25/03949 375/232
2024/0259176 A1* 8/2024 Cho ...................... H04L 7/0025

FOREIGN PATENT DOCUMENTS

WO WO 2019/091110 A1 5/2019

* cited by examiner

*Primary Examiner* — Sung S Ahn
(74) *Attorney, Agent, or Firm* — Birch, Stewart, Kolasch & Birch, LLP

(57) ABSTRACT

In a receiver, a phase interpolator generates multiple interpolated clock signals. Multiple decoders cooperate to demultiplex, with reference to the interpolated clock signals, a feed-in data signal into multiple first demultiplexed data signals respectively provided thereby. Each decoder demultiplexes the first demultiplexed data signal provided thereby into multiple second demultiplexed data signals, and decodes the second demultiplexed data signals respectively into multiple decoded signals. Based on a decoded output originating from the decoded signals generated by the decoders, an adaptive controller generates an output data signal, and performs adaptive calibration on the phase interpolator to change phases of the interpolated clock signals when absolute values of two digital values respectively representing data portions of a second sample and a third sample of the decoded signals are not equal, where the second and third samples are generated respectively before and after generation of a first sample of the decoded signals.

20 Claims, 5 Drawing Sheets

RECEIVER PERFORMING ADAPTIVE CALIBRATION, AND DATA RECEIVING METHOD

FIELD

The disclosure relates to a receiver, and more particularly to a receiver performing adaptive calibration and a data receiving method.

BACKGROUND

The Serializer/Deserializer (SerDes) function is widely used in communication standards (e.g., Ethernet, peripheral component interconnect express (PCIe), universal serial bus (USB), etc.). It is important that a receiver for converting serial input data into parallel output data can have good clock and data recovery performance so as to attain a low bit error rate.

SUMMARY

Therefore, an object of the disclosure is to provide a receiver and a data receiving method that can have good clock and data recovery performance.

According to an aspect of the disclosure, the receiver includes a phase interpolator, a decoder device and an adaptive controller. The phase interpolator receives a clock input, and performs phase interpolation on the clock input to generate a number (N) of interpolated clock signals, where N≥2 and a phase shift of each of the number (N) of interpolated clock signals with respect to the clock input is adjustable. The decoder device includes a number (N) of decoders. Each of the number (N) of decoders is connected to the phase interpolator to receive a respective one of the number (N) of interpolated clock signals. The number (N) of decoders cooperate with each other to receive a feed-in data signal that is in a pulse amplitude modulation (PAM)-M format, where M≥3, and to demultiplex, with reference to the number (N) of interpolated clock signals, the feed-in data signal into a number (N) of first demultiplexed data signals that are respectively provided by the number (N) of decoders. Each of the number (N) of decoders demultiplexes the first demultiplexed data signal provided thereby into a number (P) of second demultiplexed data signals, and decodes the number (P) of second demultiplexed data signals respectively into a number (P) of decoded signals, where P≥2, each of the number (P) of decoded signals contains a plurality of samples, the samples of the number (P) of decoded signals are generated sequentially, each of the samples of the number (P) of decoded signals contains a data portion, and each of the samples of at least one of the number (P) of decoded signals further contains an error portion. The adaptive controller is connected to the decoder device to receive a decoded output that originates from the decoded signals generated by the number (N) of decoders, and is further connected to the phase interpolator. Based on the decoded output, the adaptive controller generates an output data signal, and performs adaptive calibration on the phase interpolator to adjust the phase shifts of the number (N) of interpolated clock signals with reference to the data portion and the error portion of a first sample of the decoded signals, the data portion of a second sample of the decoded signals that is generated before the generation of the first sample of the decoded signals, and the data portion of a third sample of the decoded signals that is generated after the generation of the first sample of the decoded signals. The adaptive controller adjusts the phase shifts of the number (N) of interpolated clock signals to change phases of the number (N) of interpolated clock signals when an absolute value of a digital value representing the data portion of the second sample of the decoded signals is not equal to an absolute value of a digital value representing the data portion of the third sample of the decoded signals.

According to another aspect of the disclosure, the data receiving method is to be implemented by a receiver, and includes steps of: (A) decoding an input data signal into a decoded output based on a clock signal, where the decoded output contains a plurality of samples that are generated sequentially, each of the plurality of samples contains a data portion, and each of at least some of the plurality of samples contains an error portion; and (B) adjusting a phase of the clock signal with reference to the data portion and the error portion of a first sample of the decoded output, the data portion of a second sample of the decoded output that is generated before the generation of the first sample of the decoded output, and the data portion of a third sample of the decoded output that is generated after the generation of the first sample of the decoded output. In step (B), the phase of the clock signal is changed when an absolute value of a digital value representing the data portion of the second sample of the decoded output is not equal to an absolute value of a digital value representing the data portion of the third sample of the decoded output.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
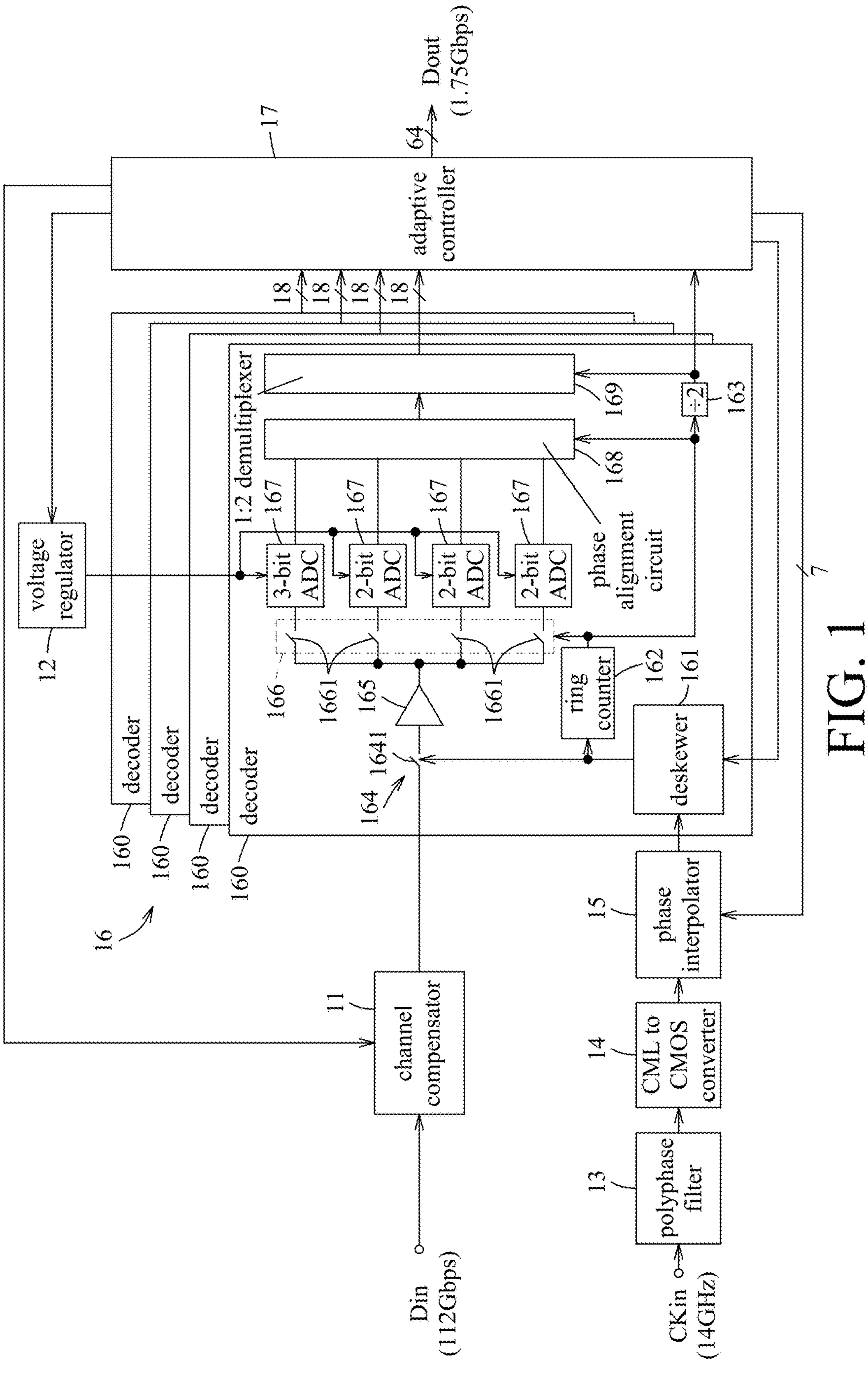
FIG. 1 is a circuit block diagram illustrating an embodiment of a receiver according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
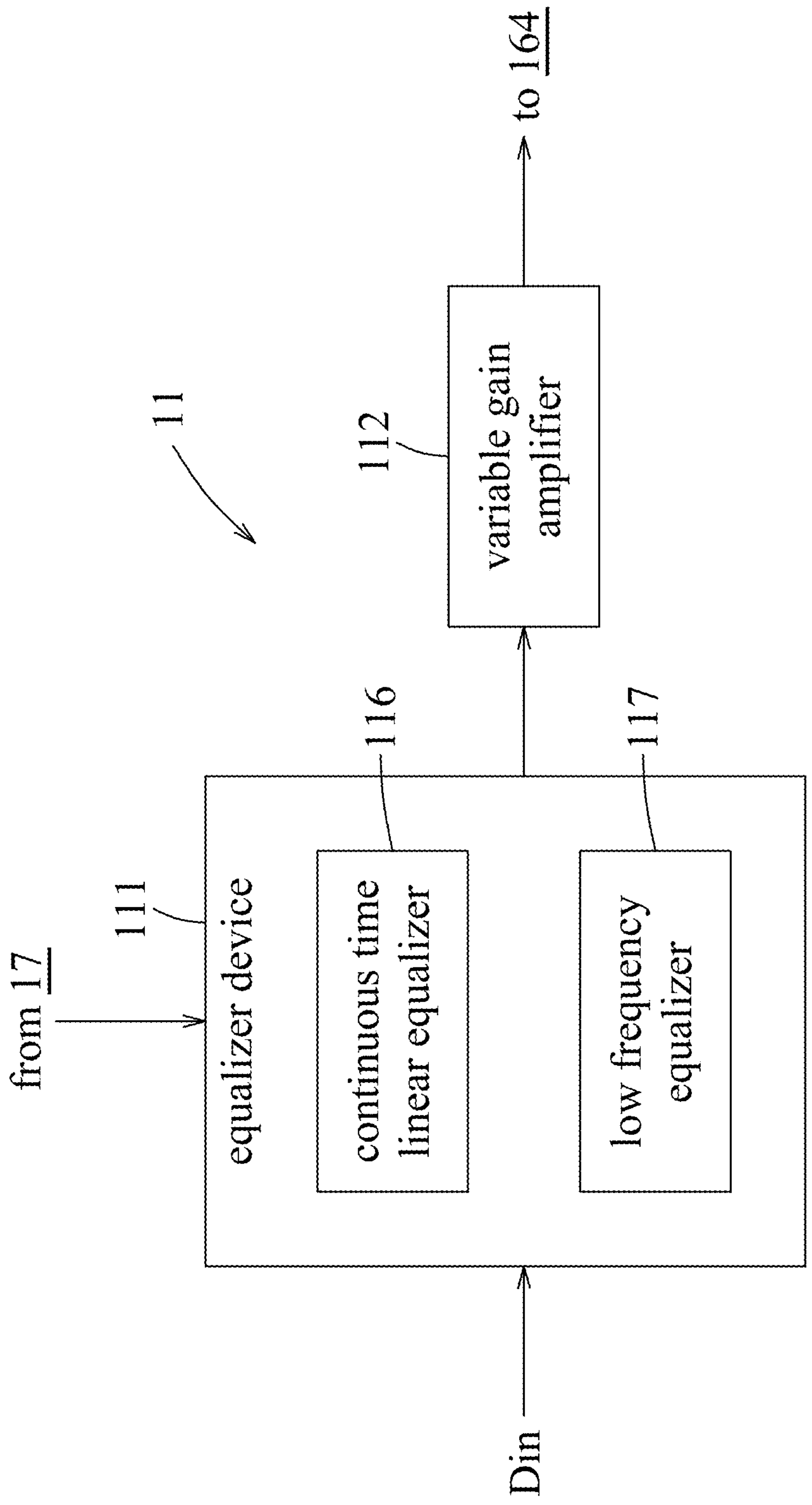
FIG. 2 is a block diagram illustrating a channel compensator of the embodiment.

Referring to FIGS. 1 and 2, an embodiment of a receiver according to the disclosure is for converting serial input data into parallel output data, and includes a channel compensator 11, a voltage regulator 12, a polyphase filter 13, a current mode logic (CML) to complementary metal oxide semiconductor (CMOS) converter 14, a phase interpolator 15, a decoder device 16 and an adaptive controller 17.

The channel compensator 11 receives an input data signal (Din) that is in a pulse amplitude modulation (PAM)-M format, and performs channel compensation on the input data signal (Din) to generate a feed-in data signal in the PAM-M format, where M≥3 and a gain of the channel compensator 11 is adjustable. For illustration purposes, in this embodiment, each of the input data signal (Din) and the feed-in data signal is in a PAM-4 format (i.e., M=4), and has a data rate of 112 Gbps (i.e., 56 Gbaud).

In this embodiment, the channel compensator 11 includes an equalizer device 111 and a variable gain amplifier (VGA) 112. The equalizer device 111 includes a continuous time linear equalizer (CTLE) 116 and a low frequency equalizer (LFEQ) 117. High frequency components of the input data signal (Din) are compensated by the continuous time linear equalizer 116, medium and low frequency components of the input data signal (Din) are compensated by the low frequency equalizer 117, and a resultant signal from the aforesaid compensations is adjusted by the variable gain amplifier 112 in pulse amplitude, so as to generate the feed-in data signal. Parameters of the continuous time linear equalizer 116 and the low frequency equalizer 117 can be adjusted to change the gain of the channel compensator 11.

The voltage regulator 12 generates a reference voltage having a magnitude that is adjustable.

The polyphase filter 13 receives a differential input clock signal pair (CKin) of a CML level, and splits the differential input clock signal pair (CKin) into two differential first clock signal pairs that are of the CML level and that are ninety degrees out of phase. For illustration purposes, in this embodiment, the differential input clock signal pair (CKin) has a frequency of 14 GHz.

The CML to CMOS converter 14 is connected to the polyphase filter 13 to receive the differential first clock signal pairs, and converts the differential first clock signal pairs respectively into two differential second clock signal pairs of a CMOS level.

The phase interpolator 15 cooperates with some components of the adaptive controller 17 to constitute a clock data recovery (CDR) circuit. The phase interpolator 15 is connected to the CML to CMOS converter 14 to receive the differential second clock signal pairs that cooperatively constitute a clock input, and performs phase interpolation on the clock input to generate a number (N) of interpolated clock signals, where N≥2. A phase shift of each of the interpolated clock signals with respect to the clock input is adjustable. For illustration purposes, in this embodiment, four interpolated clock signals are generated (i.e., N=4).

The decoder device 16 includes a number (N) of decoders 160 (there are four decoders 160 in this embodiment). In this embodiment, each of the decoders 160 includes a deskewer 161, a ring counter 162, a 1/Q divider 163, a first demultiplexer 164, a buffer 165, a second demultiplexer 166, a number (P) of analog to digital converters (ADCs) 167, a phase alignment circuit 168 and a 1:Q demultiplexer 169, where P≥2 and Q≥2. For illustration purposes, in this embodiment, a ½ divider 163, four ADCs 167 and a 1:2 demultiplexer 169 are used (i.e., P=4 and Q=2).

For each of the decoders 160, the deskewer 161 is connected to the phase interpolator 15 to receive a respective one of the interpolated clock signals, and delays the respective one of the interpolated clock signals in generating a deskewed clock signal. The delay of the deskewed clock signal with respect to the respective one of the interpolated clock signals is adjustable. The first demultiplexer 164 is connected to the deskewer 161 to receive the deskewed clock signal, and is further connected to the channel compensator 11.

The first demultiplexers 164 of the decoders 160 cooperate with each other to receive the feed-in data signal from the channel compensator 11, and to demultiplex, based on the deskewed clock signals generated by the deskewers 161 of the decoders 160, the feed-in data signal into a number (N) of first demultiplexed data signals (there are four first demultiplexed data signals in this embodiment) that are respectively outputted by the first demultiplexers 164. In this embodiment, each of the first demultiplexed data signals has a data rate of 14 Gbaud.

It should be noted that, for each of the deskewed clock signals, by adjusting the delay of the deskewed clock signal, a skew that is between the deskewed clock signal and any one of the other one(s) of the deskewed clock signals can be changed.

In this embodiment, for each of the decoders 160, the first demultiplexer 164 includes a sampling switch 1641. The sampling switch 1641 has a first terminal that is connected to the channel compensator 11 to receive the feed-in data signal, a second terminal that provides the corresponding one of the first demultiplexed data signals, and a control terminal that is connected to the deskewer 161 to receive the deskewed clock signal. The sampling switch 1641 switches between conduction and non-conduction based on the deskewed clock signal. When the sampling switch 1641 conducts, the feed-in data signal is transmitted through the sampling switch 1641 to serve as the corresponding one of the first demultiplexed data signals.

For each of the decoders 160, the ring counter 162 is connected to the deskewer 161 to receive the deskewed clock signal, and generates, based on the deskewed clock signal, a counting output that is P-bits wide (four-bits wide in this embodiment). A predetermined logic value (e.g., logic value "1") circulates around the bits of the counting output at the pace defined by the deskewed clock signal. The 1/Q divider 163 (the ½ divider 163 in this embodiment) is connected to the ring counter 162 to receive the counting output, and generates, based on the counting output, a third clock signal having a frequency that is 1/Q (½ in this embodiment) of a frequency of the counting output.

For each of the decoders 160, the buffer 165 is connected to the second terminal of the sampling switch 1641 to receive the first demultiplexed data signal, and buffers the first demultiplexed data signal to generate a to-be-decoded data signal in the PAM-M format (the PAM-4 format in this embodiment). The second demultiplexer 166 is connected to the buffer 165 to receive the to-be-decoded data signal, is further connected to the ring counter 162 to receive the counting output, and demultiplexes the to-be decoded data signal into a number (P) of second demultiplexed data signals (there are four second demultiplexed data signals in this embodiment) based on the counting output. Each of the ADCs 167 is connected to the second demultiplexer 166 to receive a respective one of the second demultiplexed data signals, and is further connected to the voltage regulator 12 to receive the reference voltage. One of the ADCs 167 is an (m+1)-bit ADC, and performs analog to digital conversion on the respective one of the second demultiplexed data signals based on the reference voltage to generate a first decoded signal in a non-return-to-zero (NRZ) format, where $m=\lceil \log_2 M \rceil$ (m=2 and said one of the ADCs 167 is a three-bit ADC in this embodiment). The first decoded signal contains a data portion that is m-bits wide (two-bits wide in this embodiment) and an error portion that is one-bit wide. Each of the other one(s) of the ADCs 167 is an m-bit ADC (a two-bit ADC in this embodiment), and performs analog to digital conversion on the respective one of the second demultiplexed data signals based on the reference voltage to generate a second decoded signal in the NRZ format. The second decoded signal contains a data portion that is m-bits wide (two-bits wide in this embodiment). In this embodiment, each of the second demultiplexed data signals has a data rate of 3.5 Gbaud.

In this embodiment, for each of the decoders 160, the second demultiplexer 166 includes a number (P) of sampling switches 1661 (there are four sampling switches 1661 in this embodiment). Each of the sampling switches 1661 has a first terminal that is connected to the buffer 165 to receive the to-be-decoded data signal, a second terminal that provides a respective one of the second demultiplexed data signals, and a control terminal that is connected to the ring counter 162 to receive a respective one of the bits of the counting output. Each of the sampling switches 1661 conducts when the respective one of the bits of the counting output is at the predetermined logic value (the logic value "1" in this embodiment), and does not conduct when otherwise. For each of the sampling switches 1661, when the sampling switch 1661 conducts, the feed-in-data signal is transmitted through the sampling switch 1661 to serve as the respective one of the second demultiplexed data signals. In addition, each of the ADCs 167 is a successive approximation ADC.

For each of the decoders 160, the phase alignment circuit 168 is connected to the ADCs 167 to receive the first and second decoded signals, is further connected to the ring counter 162 to receive the counting output, and aligns the first and second decoded signals based on the counting output to generate an aligned signal that contains a data portion and an error portion. The data portion of the aligned signal is (m×P)-bits wide (eight-bits wide in this embodiment), and originates from the data portions of the first and second decoded signals. The error portion of the aligned signal is one-bit wide, and originates from the error portion of the first decoded signal. The 1:Q demultiplexer 169 (the 1:2 demultiplexer 169 in this embodiment) is connected to the phase alignment circuit 168 to receive the aligned signal, is further connected to the 1/Q divider 163 (the ½ divider 163 in this embodiment) to receive the third clock signal, and demultiplexes, based on the third clock signal, the aligned signal into a demultiplexed signal that contains a data portion and an error portion. The data portion of the demultiplexed signal is (m×P×Q)-bits wide (sixteen-bits wide in this embodiment), and originates from the data portions of the first and second decoded signals. The error portion of the demultiplexed signal is Q-bits wide (two-bits wide in this embodiment), and originates from the error portion of the first decoded signal. The demultiplexed signals generated by the 1:Q demultiplexers 169 (the 1:2 demultiplexers 169 in this embodiment) of the decoders 160 cooperatively constitute a decoded output. In this embodiment, for each of the decoders 160, the aligned signal has a data rate of 8×3.5 Gbps for the data portion thereof and a data rate of 1×3.5 Gbps for the error portion thereof, and the demultiplexed signal has a data rate of 16×1.75 Gbps for the data portion thereof and a data rate of 2×1.75 Gbps for the error portion thereof.

The adaptive controller 17 is connected to the 1:Q demultiplexers 169 (the 1:2 demultiplexers 169 in this embodiment) of the decoders 160 to receive the decoded output, is further connected to the equalizer device 111, the voltage regulator 12, the phase interpolator 15 and the deskewers 161 of the decoders 160, and generates an output data signal (Dout) based on a data portion of the decoded output that originates from the data portions of the first and second decoded signals generated by the ADCs 167 of the decoders 160. The adaptive controller 17 further performs adaptive calibration on the equalizer device 111, the voltage regulator 12, the phase interpolator 13 and the deskewers 161 of the decoders 160 to adjust the gain of the channel compensator 11, the magnitude of the reference voltage, the phase shifts of the interpolated clock signals and the delays of the deskewed clock signals based on an error portion of the decoded output that originated from the error portions of the first decoded signals and on the data portion of the decoded output, so as to obtain an optimal quality for the feed-in data signal's eye diagram, a correct swing of the feed-in data signal, and optimal sample positions of the feed-in data signal. In this embodiment, the output data signal (Dout) has a data rate of 64×1.75 Gbps.

In this embodiment, each of the first and second decoded signals contains a plurality of samples that are sequentially arranged in time. The ADCs 167 of the decoders 160 operate one by one cyclically at a pace defined by a time interval corresponding to a frequency that is a number (N) of times (four times in this embodiment) a frequency of each of the interpolated clock signals, so as to generate the samples of the first and second decoded signals. Table 1 shows an exemplary sequence of the generation of the samples of the first and second decoded signals in each operation cycle, where D[•] denotes the data portion of a sample of the first and second decoded signals which is at one of a logic value "00" (corresponding to a digital value of −3), a logic value "01" (corresponding to a digital value of −1), a logic value "10" (corresponding to a digital value of +1) and a logic value "11" (corresponding to a digital value of +3), and E[•] denotes the error portion of a sample of the first decoded signals which is at one of a logic value "0" (corresponding to a digital value of −1) and a logic value "1" (corresponding to a digital value of +1).

TABLE 1

| | 3-bit ADC | 2-bit ADC (I) | 2-bit ADC (II) | 2-bit ADC (III) |
|---|---|---|---|---|
| Decoder | D[16 × r + 0] | D[16 × r + 4] | D[16 × r + 8] | D[16 × r + 12] |
| (I) | E[16 × r + 0] | — | — | — |
| Decoder | D[16 × r + 1] | D[16 × r + 5] | D[16 × r + 9] | D[16 × r + 13] |
| (II) | E[16 × r + 1] | — | — | — |
| Decoder | D[16 × r + 2] | D[16 × r + 6] | D[16 × r + 10] | D[16 × r + 14] |
| (III) | E[16 × r + 2] | — | — | — |
| Decoder | D[16 × r + 3] | D[16 × r + 7] | D[16 × r + 11] | D[16 × r + 15] |
| (IV) | E[16 × r + 3] | — | — | — |

r: a non-negative integer

In this embodiment, as shown in Tables 2 and 3, the adaptive controller 17 performs adaptive calibration on the phase interpolator 15 to adjust the phase shifts of the interpolated clock signals with reference to the data portion (D[a]) and the error portion (E[a]) of a sample of the first decoded signals, the data portion (D[a−1]) of a sample of the first and second decoded signals that is generated before the generation of the sample of the first decoded signals by the time interval, and the data portion (D[a+1]) of another sample of the first and second decoded signals that is generated after the generation of the sample of the first decoded signals by the time interval.

TABLE 2

| Condition | D[a − 1] | D[a] | D[a + 1] | E[a] | Phase |
|---|---|---|---|---|---|
| (a) | +3 | +3 | −3 | +1 | Defer |
| (a) | +3 | +1 | −3 | +1 | Defer |
| (a) | +1 | +1 | −1 | +1 | Defer |
| (a) | +3 | −1 | −3 | +1 | Defer |
| (a) | +1 | −1 | −1 | +1 | Defer |
| (a) | +3 | −3 | −3 | +1 | Defer |
| (b) | −3 | +3 | +3 | −1 | Defer |
| (b) | −1 | +1 | +1 | −1 | Defer |
| (b) | −3 | +1 | +3 | −1 | Defer |
| (b) | −1 | −1 | +1 | −1 | Defer |
| (b) | −3 | −1 | +3 | −1 | Defer |
| (b) | −3 | −3 | +3 | −1 | Defer |
| (c) | +1 | +1 | −3 | +1 | Defer |
| (c) | +1 | −1 | −3 | +1 | Defer |
| (c) | +1 | −3 | −3 | +1 | Defer |
| (c) | −1 | −3 | −3 | +1 | Defer |
| (d) | +1 | +3 | +3 | −1 | Defer |
| (d) | −1 | +3 | +3 | −1 | Defer |
| (d) | −1 | +1 | +3 | −1 | Defer |
| (d) | −1 | −1 | +3 | −1 | Defer |

TABLE 3

| Condition | D[a − 1] | D[a] | D[a + 1] | E[a] | Phase |
|---|---|---|---|---|---|
| (i) | +3 | +3 | −3 | −1 | Advance |
| (i) | +3 | +1 | −3 | −1 | Advance |
| (i) | +1 | +1 | −1 | −1 | Advance |
| (i) | +3 | −1 | −3 | −1 | Advance |
| (i) | +1 | −1 | −1 | −1 | Advance |
| (i) | +3 | −3 | −3 | −1 | Advance |
| (ii) | −3 | +3 | +3 | +1 | Advance |
| (ii) | −1 | +1 | +1 | +1 | Advance |
| (ii) | −3 | +1 | +3 | +1 | Advance |
| (ii) | −1 | −1 | +1 | +1 | Advance |
| (ii) | −3 | −1 | +3 | +1 | Advance |
| (ii) | −3 | −3 | +3 | +1 | Advance |
| (iii) | +3 | +3 | +1 | −1 | Advance |
| (iii) | +3 | +3 | −1 | −1 | Advance |
| (iii) | +3 | +1 | −1 | −1 | Advance |
| (iii) | +3 | −1 | −1 | −1 | Advance |
| (iv) | −3 | +1 | +1 | +1 | Advance |
| (iv) | −3 | −1 | +1 | +1 | Advance |
| (iv) | −3 | −3 | +1 | +1 | Advance |
| (iv) | −3 | −3 | −1 | +1 | Advance |

As shown in Table 2, the adaptive controller 17 adjusts the phase shifts of the interpolated clock signals to defer phases of the interpolated clock signals when any one of the following conditions is met: (a) a digital value representing the data portion (D[a−1]) of the sample of the first and second decoded signals and a digital value representing the data portion (D[a+1]) of the another sample of the first and second decoded signals have the same magnitude and opposite signs (i.e., D[a−1]≠D[a+1] and |D[a−1]|=|D[a+1]|), a digital value representing the data portion (D[a]) of the sample of the first decoded signals is no greater than the digital value representing the data portion (D[a−1]) of the sample of the first and second decoded signals and no less than the digital value representing the data portion (D[a+1]) of the another sample of the first and second decoded signals (i.e., D[a−1]≥D[a]≥D[a+1]), and a digital value representing the error portion (E[a]) of the sample of the first decoded signals is positive (i.e., E[a]>0); (b) the digital value representing the data portion (D[a−1]) of the sample of the first and second decoded signals and the digital value representing the data portion (D[a+1]) of the another sample of the first and second decoded signals have the same magnitude and opposite signs (i.e., D[a−1]≠D[a+1] and |D[a−1]|=|D[a+1]|), the digital value representing the data portion (D[a]) of the sample of the first decoded signals is no less than the digital value representing the data portion (D[a−1]) of the sample of the first and second decoded signals and no greater than the digital value representing the data portion (D[a+1]) of the another sample of the first and second decoded signals (i.e., D[a−1]≤D[a]≤D[a+1]), and the digital value representing the error portion (E[a]) of the sample of the first decoded signals is negative (i.e., E[a]≤0); (c) an absolute value of the digital value representing the data portion (D[a−1]) of the sample of the first and second decoded signals is less than an absolute value of the digital value representing the data portion (D[a+1]) of the another sample of the first and second decoded signals (i.e., |D[a−1]|<|D[a+1]|), the digital value representing the data portion (D[a]) of the sample of the first decoded signals is no greater than the digital value representing the data portion (D[a−1]) of the sample of the first and second decoded signals and no less than the digital value representing the data portion (D[a+1]) of the another sample of the first and second decoded signals (i.e., D[a−1]≥D[a]≥D[a+1]), and the digital value representing the error portion (E[a]) of the sample of the first decoded signals is positive (i.e., E[a]>0), excluding that the digital value representing the data portion (D[a−1]) of the sample of the first and second decoded signals and the digital value representing the data portion (D[a+1]) of the another sample of the first and second decoded signals have the same sign (i.e., D[a−1]×D[a+1]>0) and the digital value representing the data portion (D[a]) of the sample of the first decoded signals is equal to the digital value representing the data portion (D[a−1]) of the sample of the first and second decoded signals (i.e., D[a]=D[a−1]); and (d) the absolute value of the digital value representing the data portion (D[a−1]) of the sample of the first and second decoded signals is less than the absolute value of the digital value representing the data portion (D[a+1]) of the another sample of the first and second decoded signals (i.e., |D[a−1]|<|D[a+1]|), the digital value representing the data portion (D[a]) of the sample of the first decoded signals is no less than the digital value representing the data portion (D[a−1]) of the sample of the first and second decoded signals and no greater than the digital value representing the data portion (D[a+1]) of the another sample of the first and second decoded signals (i.e., D[a−1]≤D[a]≤D[a+1]), and the digital value representing the error portion (E[a]) of the sample of the first decoded signals is negative (i.e., E[a]≤0), excluding that the digital value representing the data portion (D[a−1]) of the sample of the first and second decoded signals and the digital value representing the data portion (D[a+1]) of the another sample of the first and second decoded signals have the same sign (i.e., D[a−1]×D[a+1]>0) and the digital value representing the data portion (D[a]) of the sample of the first decoded signals is equal to the digital value representing the data portion (D[a−1]) of the sample of the first and second decoded signals (i.e., D[a]=D[a−1]).

As shown in Table 3, the adaptive controller 17 adjusts the phase shifts of the interpolated clock signals to advance the phases of the interpolated in clock signals when any one of the following conditions is met: (i) the digital value representing the data portion (D[a−1]) of the sample of the first and second decoded signals and the digital value representing the data portion (D[a+1]) of the another sample of the first and second decoded signals have the same magnitude and opposite signs (i.e., D[a−1]≠D[a+1] and |D[a−1]|=|D[a+1]|), the digital value representing the data portion (D[a]) of the sample of the first decoded signals is no greater than the digital value representing the data portion (D[a−1]) of the sample of the first and second decoded signals and no less than the digital value representing the data portion (D[a+1]) of the another sample of the first and second decoded signals (i.e., D[a−1]≥D[a]≥D[a+1]), and the digital value representing the error portion (E[a]) of the sample of the first decoded signals is negative (i.e., E[a]≤0); (ii) the digital value representing the data portion (D[a−1]) of the sample of the first and second decoded signals and the digital value representing the data portion (D[a+1]) of the another sample of the first and second decoded signals have the same magnitude and opposite signs (i.e., D[a−1]≠D[a+1] and |D[a−1]|=|D[a+1]|), the digital value representing the data portion (D[a]) of the sample of the first decoded signals is no less than the digital value representing the data portion (D[a−1]) of the sample of the first and second decoded signals and no greater than the digital value representing the data portion (D[a+1]) of the another sample of the first and second decoded signals (i.e., D[a−1]≤D[a]≤D[a+1]), and the digital value representing the error portion (E[a]) of the sample of the first decoded signals is positive (i.e., E[a]>0); (iii) the absolute value of the digital value representing the data portion (D[a−1]) of the sample of the first and second decoded signals is greater than the absolute value of the digital value representing the data portion (D[a+1]) of the another sample of the first and second decoded signals (i.e., |D[a−1]|>|D[a+1]|), the digital value representing the data portion (D[a]) of the sample of the first decoded signals is no greater than the digital value representing the data portion (D[a−1]) of the sample of the first and second decoded signals and no less than the digital value representing the data portion (D[a+1]) of the another sample of the first and second decoded signals (i.e., D[a−1]≥D[a]≥D[a+1]), and the digital value representing the error portion (E[a]) of the sample of the first decoded signals is negative (i.e., E[a]<0), excluding that the digital value representing the data portion (D[a−1]) of the sample of the first and second decoded signals and the digital value representing the data portion (D[a+1]) of the another sample of the first and second decoded signals have the same sign (i.e., D[a−1]×D[a+1]>0) and the digital value representing the data portion (D[a]) of the sample of the first decoded signals is equal to the digital value representing the data portion (D[a+1]) of the another sample of the first and second decoded signals (i.e., D[a]=D[a+1]); and (iv) the absolute value of the digital value representing the data portion (D[a−1]) of the sample of the first and second decoded signals is greater than the absolute value of the digital value representing the data portion (D[a+1]) of the another sample of the first and second decoded signals (i.e., |D[a−1]|>|D[a+1]|), the digital value representing the data portion (D[a]) of the sample of the first decoded signals is no less than the digital value representing the data portion (D[a−1]) of the sample of the first and second decoded signals and no greater than the digital value representing the data portion (D[a+1]) of the another sample of the first and second decoded signals (i.e., D[a−1]≤D[a]≤D[a+1]), and the digital value representing the error portion (E[a]) of the sample of the first decoded signals is positive (i.e., E[a]>0), excluding that the digital value representing the data portion (D[a−1]) of the sample of the first and second decoded signals and the digital value representing the data portion (D[a+1]) of the another sample of the first and second decoded signals have the same sign (i.e., D[a−1]×D[a+1]>0) and the digital value representing the data portion (D[a]) of the sample of the first decoded signals is equal to the digital value representing the data portion (D[a+1]) of the another sample of the first and second decoded signals (i.e., D[a]=D[a+1]).

Otherwise, the adaptive controller 17 keeps the phase shifts of the interpolated clock signals unchanged.

Figure 3:
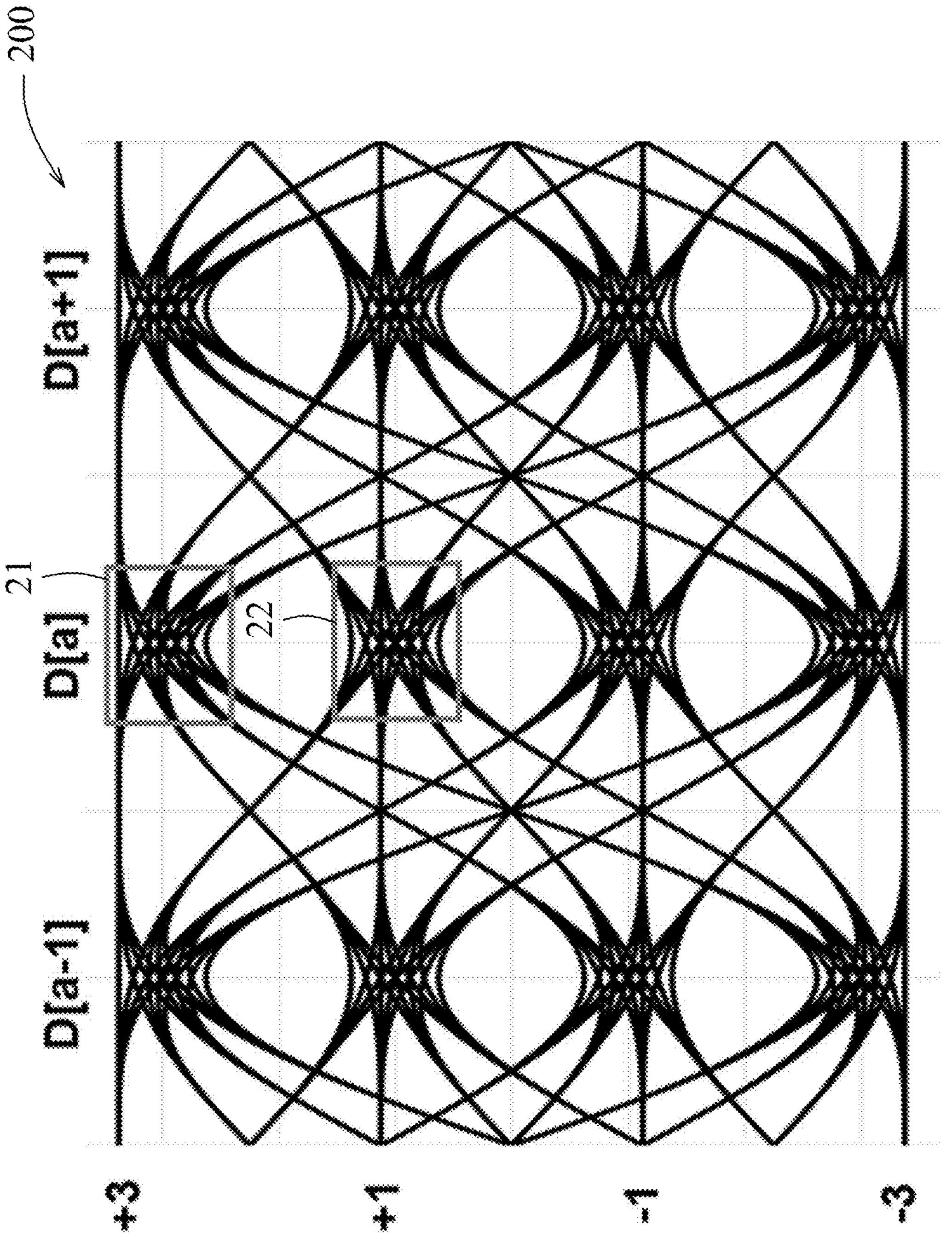
FIG. 3 is a plot illustrating an eye diagram of the embodiment.
Figure 4:
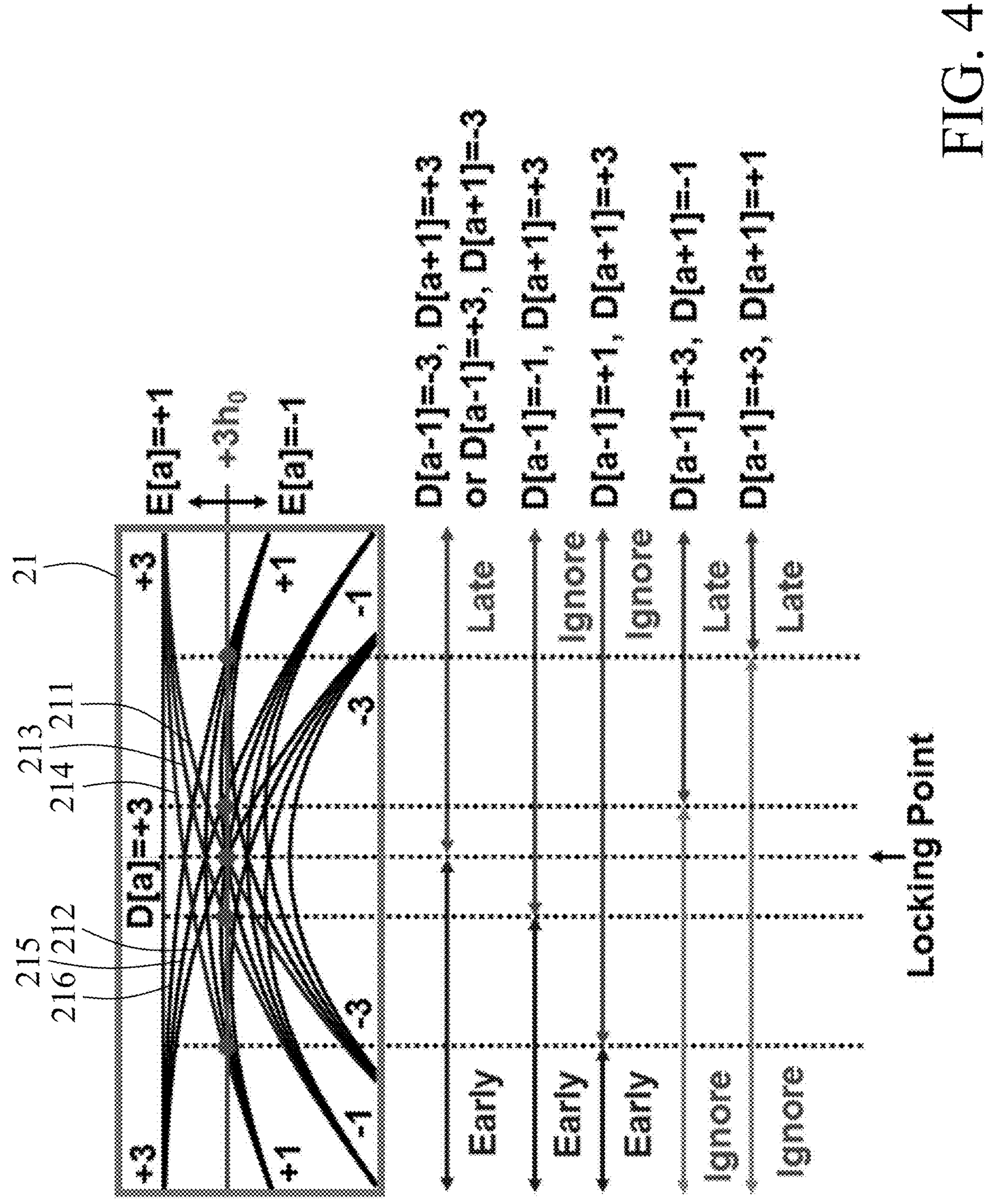
FIG. 4 is a plot illustrating a region of the eye diagram of the embodiment in which a digital value representing a data portion of a sample of multiple first decoded signals of the embodiment is +3.

Referring to FIGS. 1, 3 and 4, the digital value representing the data portion (D[a]) is +3 in a region 21 of an eye diagram 200 of the receiver of this embodiment. As shown in FIG. 4, in a case where the digital values representing the data portions (D[a−1], D[a], D[a+1]) are respectively −3, +3 and +3 as depicted by a curve 211: when the digital value representing the error portion (E[a]) is negative, the phases of the interpolated clock signals are early relative to a locking point of the clock and data recovery circuit, and the adaptive controller 17 will defer the phases of the interpolated clock signals according to Table 2; and when the digital value representing the error portion (E[a]) is positive, the phases of the interpolated clock signals are late relative to the locking point of the clock and data recovery circuit, and the adaptive controller 17 will advance the phases of the interpolated clock signals according to Table 3. In a case where the digital values representing the data portions (D[a−1], D[a], D[a+1]) are respectively +3, +3 and −3 as depicted by a curve 212: when the digital value representing the error portion (E[a]) is positive, the phases of the interpolated clock signals are early relative to the locking point of the clock and data recovery circuit, and the adaptive controller 17 will defer the phases of the interpolated clock signals according to Table 2; and when the digital value representing the error portion (E[a]) is negative, the phases of the interpolated clock signals are late relative to the locking point of the clock and data recovery circuit, and the adaptive controller 17 will advance the phases of the interpolated clock signals according to Table 3. In each of a case where the digital values representing the data portions (D[a−1], D[a], D[a+1]) are respectively −1, +3 and +3 as depicted by a curve 213 and a case where the digital values representing the data portions (D[a−1], D[a], D[a+1]) are respectively +1, +3 and +3 as depicted by a curve 214: when the digital value representing the error portion (E[a]) is negative, the phases of the interpolated clock signals are early relative to the locking point of the clock and data recovery circuit, and the adaptive controller 17 will defer the phases of the interpolated clock signals according to Table 2; and when the digital value representing the error portion (E[a]) is positive, the phases of the interpolated clock signals may be early or late relative to the locking point of the clock and data recovery circuit, and the adaptive controller 17 will keep the phases of the interpolated clock signals unchanged. In each of a case where the digital values representing the data portions (D[a−1], D[a], D[a+1]) are respectively +3, +3 and −1 as depicted by a curve 215 and a case where the digital values representing the data portions (D[a−1], D[a], D[a+1]) are respectively +3, +3 and +1 as depicted by a curve 216: when the digital value representing the error portion (E[a]) is positive, the phases of the interpolated clock signals may be early or late relative to the locking point of the clock and data recovery circuit, and the adaptive controller 17 will keep the phases of the interpolated clock signals unchanged; and when the digital value representing the error portion (E[a]) is negative, the phases of the interpolated clock signals are late relative to the locking point of the clock and data recovery circuit, and the adaptive controller 17 will advance the phases of the interpolated clock signals according to Table 3.

Figure 5:
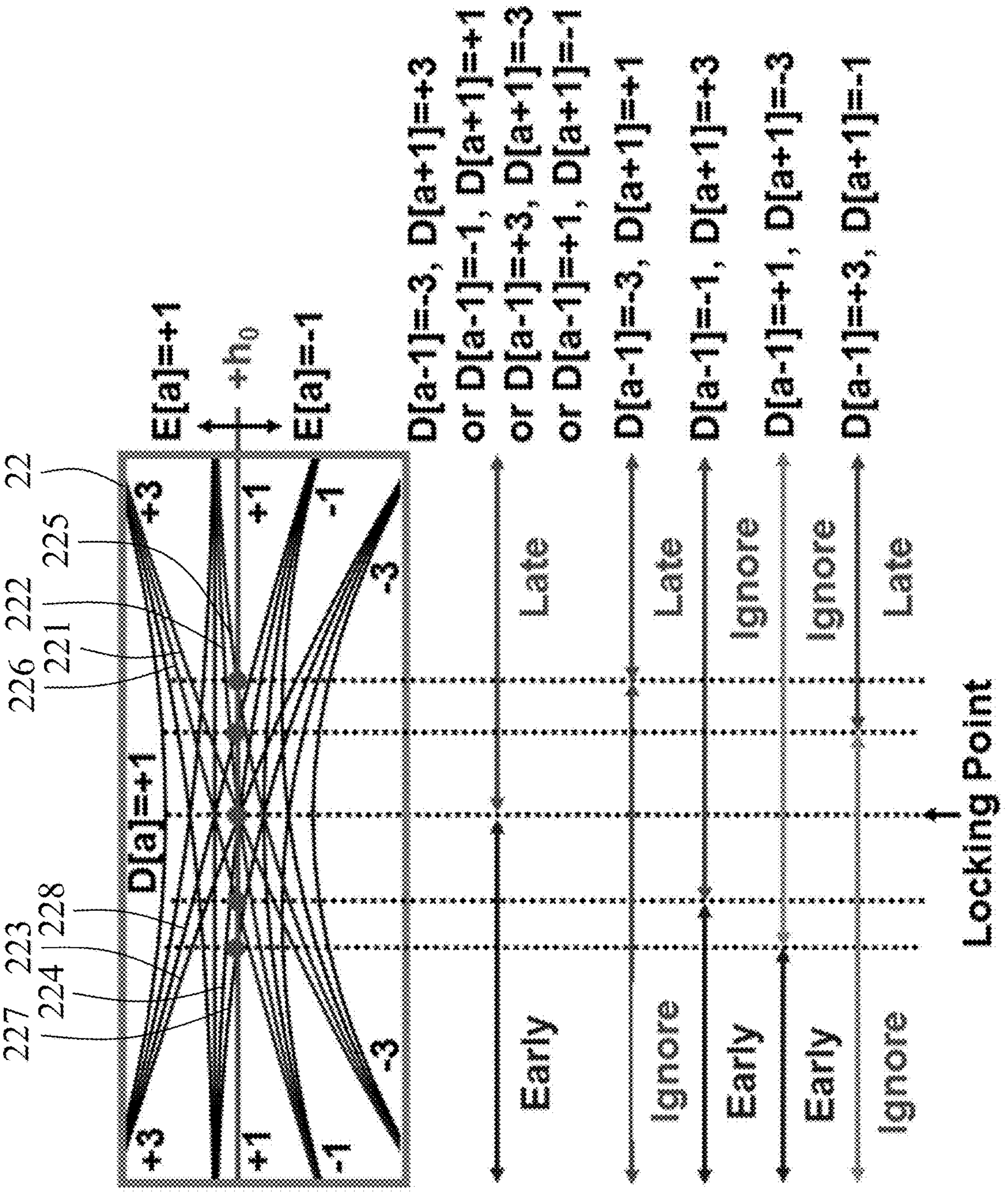
FIG. 5 is a plot illustrating a region of the eye diagram of the embodiment in which the digital value representing the data portion of the sample of the first decoded signals of the embodiment is +1.

Referring to FIGS. 1, 3 and 5, the digital value representing the data portion (D[a]) is +1 in a region 22 of the eye diagram 200 of the receiver of this embodiment. As shown in FIG. 5, in each of a case where the digital values representing the data portions (D[a−1], D[a], D[a+1]) are respectively −3, +1 and +3 as depicted by a curve 221 and a case where the digital values representing the data portions (D[a−1], D[a], D[a+1]) are respectively −1, +1 and +1 as depicted by a curve 222: when the digital value representing the error portion (E[a]) is negative relative to the locking point of the clock and data recovery circuit, the phases of the interpolated clock signals are early, and the adaptive controller 17 will defer the phases of the interpolated clock signals according to Table 2; and when the digital value representing the error portion (E[a]) is positive, the phases of the interpolated clock signals are late relative to the locking point of the clock and data recovery circuit, and the adaptive controller 17 will advance the phases of the interpolated clock signals according to Table 3. In each of a case where the digital values representing the data portions (D[a−1], D[a], D[a+1]) are respectively +3, +1 and −3 as depicted by a curve 223 and a case where the digital values representing the data portions (D[a−1], D[a], D[a+1]) are respectively +1, +1 and −1 as depicted by a curve 224: when the digital value representing the error portion (E[a]) is positive, the phases of the interpolated clock signals are early relative to the locking point of the clock and data recovery circuit, and the adaptive controller 17 will defer the phases of the interpolated clock signals according to Table 2; and when the digital value representing the error portion (E[a]) is negative, the phases of the interpolated clock signals are late relative to the locking point of the clock and data recovery circuit, and the adaptive controller 17 will advance the phases of the interpolated clock signals according to Table 3. In a case where the digital values representing the data portions (D[a−1], D[a], D[a+1]) are respectively −3, +1 and +1 as depicted by a curve 225: when the digital value representing the error portion (E[a]) is negative, the phases of the interpolated clock signals may be early or late relative to the locking point of the clock and data recovery circuit, and the adaptive controller 17 will keep the phases of the interpolated clock signals unchanged; and when the digital value representing the error portion (E[a]) is positive, the phases of the interpolated clock signals are late relative to the locking point of the clock and data recovery circuit, and the adaptive controller 17 will advance the phases of the interpolated clock signals according to Table 3. In a case where the digital values representing the data portions (D[a−1], D[a], D[a+1]) are respectively −1, +1 and +3 as depicted by a curve 226: when the digital value representing the error portion (E[a]) is negative, the phases of the interpolated clock signals are early relative to the locking point of the clock and data recovery circuit, and the adaptive controller 17 will defer the phases of the interpolated clock signals according to Table 2; and when the digital value representing the error portion (E[a]) is positive, the phases of the interpolated clock signals may be early or late relative to the locking point of the clock and data recovery circuit, and the adaptive controller 17 will keep the phases of the interpolated clock signals unchanged. In a case where the digital values representing the data portions (D[a−1], D[a], D[a+1]) are respectively +1, +1 and −3 as depicted by a curve 227: when the digital value representing the error portion (E[a]) is positive relative to the locking point of the clock and data recovery circuit, the phases of the interpolated clock signals are early, and the adaptive controller 17 will defer the phases of the interpolated clock signals according to Table 2; and when the digital value representing the error portion (E[a]) is negative, the phases of the interpolated clock signals may be early or late relative to the locking point of the clock and data recovery circuit, and the adaptive controller 17 will keep the phases of the interpolated clock signals unchanged. In a case where the digital values representing the data portions (D[a−1], D[a], D[a+1]) are respectively +3, +1 and −1 as depicted by a curve 228: when the digital value representing the error portion (E[a]) is positive, the phases of the interpolated clock signals may be early or late relative to the locking point of the clock and data recovery circuit, and the adaptive controller 17 will keep the phases of the interpolated clock signals unchanged; and when the digital value representing the error portion (E[a]) is negative, the phases of the interpolated clock signals are late relative to the locking point of the clock and data recovery circuit, and the adaptive controller 17 will advance the phases of the interpolated clock signals according to Table 3.

Details of a region of the eye diagram 200 in which the digital value representing the data portion (D[a]) is −1 and details of a region of the eye diagram 200 in which the digital value representing the data portion (D[a]) is −3 can be inferred from the description above related to the regions 21, 22, and are omitted herein for the sake of brevity.

In view of the above, by virtue of the adaptive controller 17 changing the phases of the interpolated clock signals not only when the digital value representing the data portion (D[a−1]) of the sample of the first and second decoded signals and the digital value representing the data portion (D[a+1]) of the another sample of the first and second decoded signals have the same magnitude and opposite signs (including the conditions (a), (b), (i), (ii)) but also when the absolute value of the digital value representing the data portion (D[a−1]) of the sample of the first and second decoded signals is not equal to the absolute value of the digital value representing the data portion (D[a+1]) of the another sample of the first and second decoded signals (including the conditions (c), (d), (iii), (iv)), the clock and data recovery circuit can have good performance, and the receiver of this embodiment can have a low bit error rate.

It should be noted that the approach used by the receiver of this embodiment to change the phases of the interpolated clock signals can be applied to other receivers (in which an input data signal is decoded into a decoded output based on a clock signal, the decoded output contains a plurality of samples that are generated sequentially, each of the samples contains a data portion, and each of at least some of the samples contains an error portion) to change a phase of the clock signal.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A receiver comprising:

a phase interpolator receiving a clock input, and performing phase interpolation on the clock input to generate a number (N) of interpolated clock signals, where N≥2 and a phase shift of each of the number (N) of interpolated clock signals with respect to the clock input is adjustable;

a decoder device including a number (N) of decoders;

each of said number (N) of decoders being connected to said phase interpolator to receive a respective one of the number (N) of interpolated clock signals;

said number (N) of decoders cooperating with each other to receive a feed-in data signal that is in a pulse amplitude modulation (PAM)-M format, where M≥3, and to demultiplex, with reference to the number (N) of interpolated clock signals, the feed-in data signal into a number (N) of first demultiplexed data signals that are respectively provided by said number (N) of decoders;

each of said number (N) of decoders demultiplexing the first demultiplexed data signal provided thereby into a number (P) of second demultiplexed data signals, and decoding the number (P) of second demultiplexed data signals respectively into a number (P) of decoded signals, where P≥2, each of the number (P) of decoded signals contains a plurality of samples, the samples of the number (P) of decoded signals are generated sequentially, each of the samples of the number (P) of decoded signals contains a data portion, and each of the samples of at least one of the number (P) of decoded signals further contains an error portion;

an adaptive controller connected to said decoder device to receive a decoded output that originates from the decoded signals generated by said number (N) of decoders, and further connected to said phase interpolator;

based on the decoded output, said adaptive controller generating an output data signal, and performing adaptive calibration on said phase interpolator to adjust the phase shifts of the number (N) of interpolated clock signals with reference to the data portion and the error portion of a first sample of the decoded signals, the data portion of a second sample of the decoded signals that is generated before the generation of the first sample of the decoded signals, and the data portion of a third sample of the decoded signals that is generated after the generation of the first sample of the decoded signals;

said adaptive controller adjusting the phase shifts of the number (N) of interpolated clock signals to change phases of the number (N) of interpolated clock signals when an absolute value of a digital value representing the data portion of the second sample of the decoded signals is not equal to an absolute value of a digital value representing the data portion of the third sample of the decoded signals.

2. The receiver as claimed in claim 1, wherein said adaptive controller adjusts the phase shifts of the number (N) of interpolated clock signals to defer the phases of the number (N) of interpolated clock signals when the following condition is met:

the absolute value of the digital value representing the data portion of the second sample of the decoded signals is less than the absolute value of the digital value representing the data portion of the third sample of the decoded signals, a digital value representing the data portion of the first sample of the decoded signals is no greater than the digital value representing the data portion of the second sample of the decoded signals and no less than the digital value representing the data portion of the third sample of the decoded signals, and a digital value representing the error portion of the first sample of the decoded signals is positive.

3. The receiver as claimed in claim 1, wherein said adaptive controller adjusts the phase shifts of the number (N) of interpolated clock signals to defer the phases of the number (N) of interpolated clock signals when the following condition is met:

the absolute value of the digital value representing the data portion of the second sample of the decoded signals is less than the absolute value of the digital value representing the data portion of the third sample of the decoded signals, a digital value representing the data portion of the first sample of the decoded signals is no less than the digital value representing the data portion of the second sample of the decoded signals and no greater than the digital value representing the data portion of the third sample of the decoded signals, and a digital value representing the error portion of the first sample of the decoded signals is negative.

4. The receiver as claimed in claim 1, wherein said adaptive controller adjusts the phase shifts of the number (N) of interpolated clock signals to advance the phases of the number (N) of interpolated clock signals when the following condition is met:

the absolute value of the digital value representing the data portion of the second sample of the decoded signals is greater than the absolute value of the digital value representing the data portion of the third sample of the decoded signals, a digital value representing the data portion of the first sample of the decoded signals is no greater than the digital value representing the data portion of the second sample of the decoded signals and no less than the digital value representing the data portion of the third sample of the decoded signals, and a digital value representing the error portion of the first sample of the decoded signals is negative.

5. The receiver as claimed in claim 1, wherein said adaptive controller adjusts the phase shifts of the number (N) of interpolated clock signals to advance the phases of the number (N) of interpolated clock signals when the following condition is met:

the absolute value of the digital value representing the data portion of the second sample of the decoded signals is greater than the absolute value of the digital value representing the data portion of the third sample of the decoded signals, a digital value representing the data portion of the first sample of the decoded signals is no less than the digital value representing the data portion of the second sample of the decoded signals and no greater than the digital value representing the data portion of the third sample of the decoded signals, and a digital value representing the error portion of the first sample of the decoded signals is positive.

6. The receiver as claimed in claim 1, wherein said adaptive controller further adjusts the phase shifts of the number (N) of interpolated clock signals to change the phases of the number (N) of interpolated clock signals when the digital value representing the data portion of the second sample of the decoded signals and the digital value representing the data portion of the third sample of the decoded signals have a same magnitude and opposite signs.

7. The receiver as claimed in claim 6, wherein said adaptive controller adjusts the phase shifts of the number (N) of interpolated clock signals to defer the phases of the number (N) of interpolated clock signals when the following condition is met:

the digital value representing the data portion of the second sample of the decoded signals and the digital value representing the data portion of the third sample of the decoded signals have the same magnitude and the opposite signs, a digital value representing the data portion of the first sample of the decoded signals is no greater than the digital value representing the data portion of the second sample of the decoded signals and no less than the digital value representing the data portion of the third sample of the decoded signals, and a digital value representing the error portion of the first sample of the decoded signals is positive.

8. The receiver as claimed in claim 6, wherein said adaptive controller adjusts the phase shifts of the number (N) of interpolated clock signals to defer the phases of the number (N) of interpolated clock signals when the following condition is met:

the digital value representing the data portion of the second sample of the decoded signals and the digital value representing the data portion of the third sample of the decoded signals have the same magnitude and the opposite signs, a digital value representing the data portion of the first sample of the decoded signals is no less than the digital value representing the data portion of the second sample of the decoded signals and no greater than the digital value representing the data portion of the third sample of the decoded signals, and a digital value representing the error portion of the first sample of the decoded signals is negative.

9. The receiver as claimed in claim 6, wherein said adaptive controller adjusts the phase shifts of the number (N) of interpolated clock signals to advance the phases of the number (N) of interpolated clock signals when the following condition is met:

the digital value representing the data portion of the second sample of the decoded signals and the digital value representing the data portion of the third sample of the decoded signals have the same magnitude and the opposite signs, a digital value representing the data portion of the first sample of the decoded signals is no greater than the digital value representing the data portion of the second sample of the decoded signals and no less than the digital value representing the data portion of the third sample of the decoded signals, and a digital value representing the error portion of the first sample of the decoded signals is negative.

10. The receiver as claimed in claim 6, wherein said adaptive controller adjusts the phase shifts of the number (N) of interpolated clock signals to advance the phases of the number (N) of interpolated clock signals when the following condition is met:

the digital value representing the data portion of the second sample of the decoded signals and the digital value representing the data portion of the third sample of the decoded signals have the same magnitude and the opposite signs, a digital value representing the data portion of the first sample of the decoded signals is no less than the digital value representing the data portion of the second sample of the decoded signals and no greater than the digital value representing the data portion of the third sample of the decoded signals, and a digital value representing the error portion of the first sample of the decoded signals is positive.

11. A data receiving method to be implemented by a receiver, and comprising steps of:

(A) decoding an input data signal into a decoded output based on a clock signal, where the decoded output contains a plurality of samples that are generated sequentially, each of the plurality of samples contains a data portion, and each of at least some of the plurality of samples contains an error portion; and (B) adjusting a phase of the clock signal with reference to the data portion and the error portion of a first sample of the decoded output, the data portion of a second sample of the decoded output that is generated before the generation of the first sample of the decoded output, and the data portion of a third sample of the decoded output that is generated after the generation of the first sample of the decoded output;

wherein, in step (B), the phase of the clock signal is changed when an absolute value of a digital value representing the data portion of the second sample of the decoded output is not equal to an absolute value of a digital value representing the data portion of the third sample of the decoded output.

12. The data receiving method as claimed in claim 11, wherein, in step (B), the phase of the clock signal is deferred when the following condition is met:

the absolute value of the digital value representing the data portion of the second sample of the decoded output is less than the absolute value of the digital value representing the data portion of the third sample of the decoded output, a digital value representing the data portion of the first sample of the decoded output is no greater than the digital value representing the data portion of the second sample of the decoded output and no less than the digital value representing the data portion of the third sample of the decoded output, and a digital value representing the error portion of the first sample of the decoded output is positive.

13. The data receiving method as claimed in claim 11, wherein, in step (B), the phase of the clock signal is deferred when the following condition is met:

the absolute value of the digital value representing the data portion of the second sample of the decoded output is less than the absolute value of the digital value representing the data portion of the third sample of the decoded output, a digital value representing the data portion of the first sample of the decoded output is no less than the digital value representing the data portion of the second sample of the decoded output and no greater than the digital value representing the data portion of the third sample of the decoded output, and a digital value representing the error portion of the first sample of the decoded output is negative.

14. The data receiving method as claimed in claim 11, wherein, in step (B), the phase of the clock signal is advanced when the following condition is met:

the absolute value of the digital value representing the data portion of the second sample of the decoded output is greater than the absolute value of the digital value representing the data portion of the third sample of the decoded output, a digital value representing the data portion of the first sample of the decoded output is no greater than the digital value representing the data portion of the second sample of the decoded output and no less than the digital value representing the data portion of the third sample of the decoded output, and a digital value representing the error portion of the first sample of the decoded output is negative.

15. The data receiving method as claimed in claim 11, wherein, in step (B), the phase of the clock signal is advanced when the following condition is met:

the absolute value of the digital value representing the data portion of the second sample of the decoded output is greater than the absolute value of the digital value representing the data portion of the third sample of the decoded output, a digital value representing the data portion of the first sample of the decoded output is no less than the digital value representing the data portion of the second sample of the decoded output and no greater than the digital value representing the data portion of the third sample of the decoded output, and a digital value representing the error portion of the first sample of the decoded output is positive.

16. The data receiving method as claimed in claim 11, wherein, in step (B), the phase of the clock signal is further changed when the digital value representing the data portion of the second sample of the decoded output and the digital value representing the data portion of the third sample of the decoded output have a same magnitude and opposite signs.

17. The data receiving method as claimed in claim 16, wherein, in step (B), the phase of the clock signal is deferred when the following condition is met:

the digital value representing the data portion of the second sample of the decoded output and the digital value representing the data portion of the third sample of the decoded output have the same magnitude and the opposite signs, a digital value representing the data portion of the first sample of the decoded output is no greater than the digital value representing the data portion of the second sample of the decoded output and no less than the digital value representing the data portion of the third sample of the decoded output, and a digital value representing the error portion of the first sample of the decoded output is positive.

18. The data receiving method as claimed in claim 16, wherein, in step (B), the phase of the clock signal is deferred when the following condition is met:

the digital value representing the data portion of the second sample of the decoded output and the digital value representing the data portion of the third sample of the decoded output have the same magnitude and the opposite signs, a digital value representing the data portion of the first sample of the decoded output is no less than the digital value representing the data portion of the second sample of the decoded output and no greater than the digital value representing the data portion of the third sample of the decoded output, and a digital value representing the error portion of the first sample of the decoded output is negative.

19. The data receiving method as claimed in claim 16, wherein, in step (B), the phase of the clock signal is advanced when the following condition is met:

the digital value representing the data portion of the second sample of the decoded output and the digital value representing the data portion of the third sample of the decoded output have the same magnitude and the opposite signs, a digital value representing the data portion of the first sample of the decoded output is no greater than the digital value representing the data portion of the second sample of the decoded output and no less than the digital value representing the data portion of the third sample of the decoded output, and a digital value representing the error portion of the first sample of the decoded output is negative.

20. The data receiving method as claimed in claim 16, wherein, in step (B), the phase of the clock signal is advanced when the following condition is met:

the digital value representing the data portion of the second sample of the decoded output and the digital value representing the data portion of the third sample of the decoded output have the same magnitude and the opposite signs, a digital value representing the data portion of the first sample of the decoded output is no less than the digital value representing the data portion of the second sample of the decoded output and no greater than the digital value representing the data portion of the third sample of the decoded output, and a digital value representing the error portion of the first sample of the decoded output is positive.

* * * * *